Oct. 12, 1937.  M. D. SWORDS  2,095,460
TANK CAR
Filed July 29, 1933
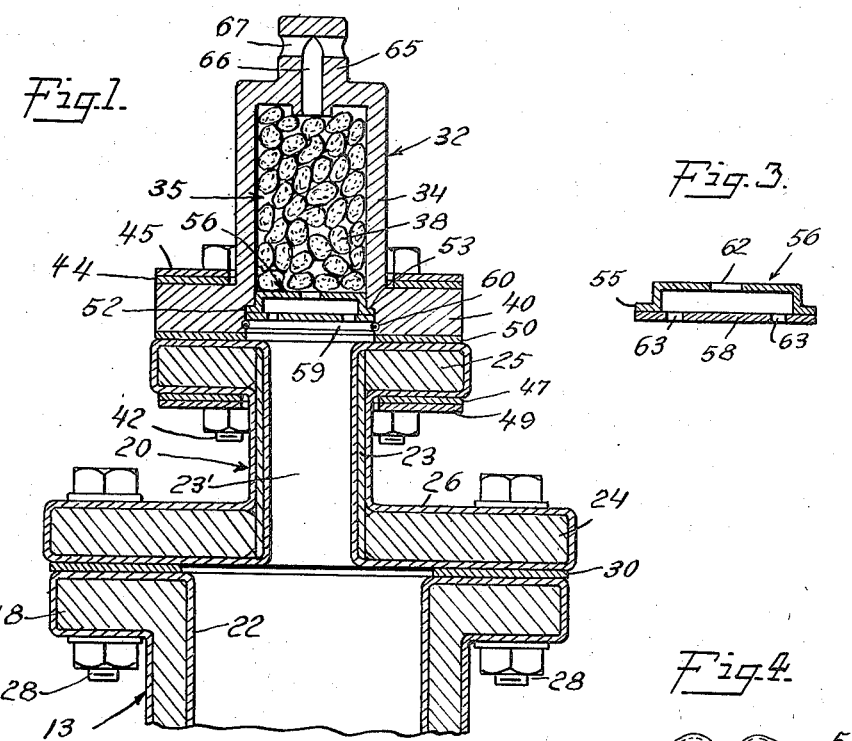
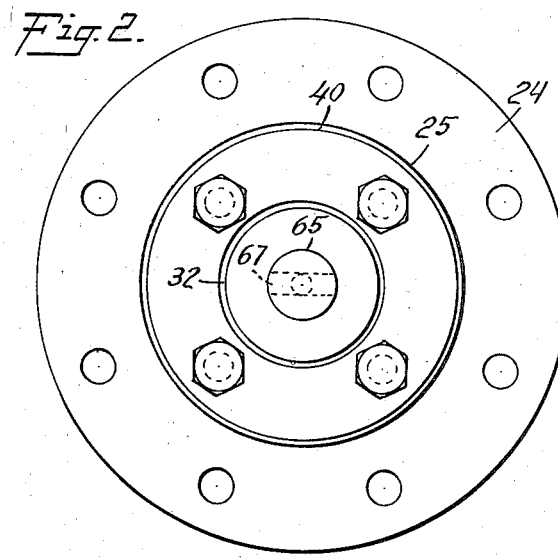
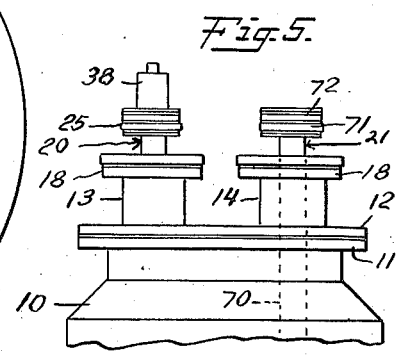
INVENTOR
M. D. Swords
BY
ATTORNEY Patented Oct. 12, 1937

2,095,460

UNITED STATES PATENT OFFICE 2,095,460

TANK CAR

Michael D. Swords, Chicago, Ill., assignor to General Chemical Company, New York, N. Y., a corporation of New York Application July 29, 1933, Serial No. 682,804

4 Claims. (Cl. 220—85)

This invention relates to vents or breathing devices for tanks or other vessels adapted to be employed for storage or transportation of liquids. More particularly, the invention is directed to vents designed for use in connection with tank cars especially those lined with rubber or other non-corrodible material and constructed for transportation of corrosive liquids such as hydrochloric acid.

In rubber-lined tanks, the formation of appreciable pressure or vacuum because of changes in atmospheric temperatures or on account of sudden shock is objectionable. This is particularly true in the case of tank cars which under usual conditions encountered in service are subjected to relatively widely varying temperature conditions and to rough handling in transit. Construction costs of rubber-lined tank cars are high, and to a large extent the durability of the rubber lining is dependent principally upon the adhesion of the rubber through a bond to the steel. While in transit, heavy shocks to which the cars are subjected cause the liquid contents to surge from one end of the tank to the other, setting up alternate pressure and vacuum which together with pressure and vacuum brought about by atmospheric temperature changes, subject the bond holding the rubber lining to the steel to severe strains which eventually result in failure of the bond between the rubber lining and the steel shell. If an ordinary vent were employed on a tank car used for shipment of a corrosive liquid such as hydrochloric acid, hydrochloric acid gas passing through the vent would be lost to the atmosphere, the exterior of the tank car dome and of the tank shell itself would be damaged by the corrosive action of the escaping gases, and the hazard arising from acid splash through the vent would be present at all times.

Although it is to be understood the invention is directed to vents which may be employed to advantage on numerous types of tanks or vessels adapted for use in storage or transportation of various kinds of liquid substances, preferred embodiments of the invention as herein described are especially suitable for tank cars used for transportation of acids such as hydrochloric acid. With the latter particularly in view, one of the principal objects of the invention lies in the provision of a vent designed particularly to overcome the damage to the tank car lining caused by the creation of pressure or vacuum within the tank while in service. The invention also provides a vent which avoids to a large degree loss of acid as escaping gas, prevents damage to the exterior metallic parts of the tank, and eliminates possibility of acid splash through the vent. It is a further object of the invention to provide a vent of such nature that air drawn into the tank to offset vacuum is filtered to thoroughly remove foreign material of any objectionable nature and prevent admission of the same to the tank thus avoiding contamination of or deleterious effects on the product in the tank.

Generally speaking, the invention comprises a vent device having a chamber communicating with the inside of the tank and with the atmosphere, the chamber being of appreciable size and formed to hold packing or filtering material, the construction being such that gases expelled from the tank or drawn into the tank from the atmosphere are caused to pass through the packing material and are thus filtered or strained by the packing material before ejection from or admission to the tank.

In one form of the invention, the chamber for the packing material is placed upon the upper end of a conduit or passage opening into the interior of the tank. The bottom of the chamber is formed by a perforated plate which supports the packing material and provides for free passage of gases and/or vapors between the tank and the packing material chamber. In a preferred embodiment, the construction is such that there is additionally provided a baffle between the packing material chamber and the inside of the tank, the baffle being so arranged that liquid or spray particles are to a large extent separated from the gases passing out through the vent and are returned to the tank.

Further objects and features of novelty will be apparent from the following description taken in connection with the accompanying drawing, in which Fig. 1 is a vertical section of a vent comprising a preferred embodiment of the invention;

Fig. 2 is a plan view of Fig. 1;

Fig. 3 is an enlarged detail in vertical section;

Fig. 4 is a plan detail of a rubber-covered locking spring, and

Fig. 5 is an elevation on a reduced scale of a portion of a tank to which the vent device of the invention may be applied.

Referring to the drawing, particularly Fig. 5, reference numeral 10 indicates the top of the dome of a rubber-lined tank of the type which may be supported on rolling stock. The upper edge of the dome terminates in a horizontal flange 11 to which the dome cover 12 may be bolted or otherwise attached. Projecting upwardly from the dome cover are cylindrical members 13 and 14, the upper end of member 13 being shown in vertical section in Fig. 1. Members 13 and 14 are provided with outwardly turned flanges 18 to which nozzles generally designated by reference numerals 20 and 21 may be detachably connected. It will be understood the inner surfaces of the dome, the dome cover and cylindrical members 13 and 14 are suitably rubber-lined as is customary in the art and indicated at 22.

Referring to Fig. 1, the nozzle 20 comprises a tube or pipe section 23 to the ends of which are welded discs or rings forming lower and upper flanges 24 and 25. As shown in Fig. 1, nozzle 20 is covered both inside and out as indicated at 26 with rubber or other acid resistant material. Nozzle 20 is removably attached to member 13 by bolts 28 passing through flanges 24 and 18. A soft rubber gasket 30 may be interposed between the upper surface of flange 18 and the lower face of flange 24 to afford a tight joint.

Mounted on the top of nozzle 20 is a vent cap 32 which may be made of hard rubber or other suitable material. The cap comprises principally an elongated section or casing 34 forming a cylindrical chamber 35 which is filled with porous packing material 38 such as relatively small pieces of sponge rubber. Formed integrally on the lower end of section 34 of the cap is the disk or flange 40 for attaching the cap to nozzle 20 by bolts 42 passing through cap flange 40 and nozzle flange 25. Resting on the upper face of flange 40 is a soft rubber gasket 44 providing a cushion for a metallic washer 45 against which the heads of bolts 42 are drawn. On the underside of flange 25 are a sectional soft rubber gasket 47 and a sectional metallic washer 49 affording a bearing surface for the nuts on the ends of bolts 42. A soft rubber gasket 50 provides a tight joint between the cap 32 and the nozzle 20.

Cut in the inner surface of disk 40 is a cylindrical section 52 having a diameter slightly greater than that of chamber 35. Section 52 terminates in a shoulder 53 forming a seat for flange 55 of a hard rubber cup 56. Bearing against the under face of flange 55 is a hard rubber disk or baffle plate 58 which may conveniently be held in place by a rubber covered spring 59, shown in Fig. 4, removably seated in a groove 60 in the face of cylindrical section 52. Cup 56, disk 58 and spring 60 together form a support for the packing material 38 in chamber 35 which is in communication through passage 23' with the interior of the tank.

As shown more particularly in the detail of Fig. 3, passing through the center of cup 56 is an opening or perforation 62. The disk 58 is provided adjacent the circular edge with a plurality of smaller openings 63 positioned so as to be out of vertical alignment with the opening 62 in cup 56.

The top of the vent casing terminates in a nob or projection 65. Communicating with chamber 35 and extending vertically through the center of the nob is a passage 66 opening into a horizontal conduit 67 passing diametrically through nob 65, passages 66 and 67 together providing communication between packed chamber 35 and the atmosphere.

Referring to Fig. 5, nozzle 21, which may be the upper end of a discharge pipe 70 extending to the bottom of the tank, for example as shown in Tiley U. S. Patent No. 1,745,065, January 28, 1930, carries in the upper end a flange 71 to which a blank flange 72 or the end of a discharge hose line may be connected.

When the vent device of the invention is applied to a tank car such as shown for example in the Tiley patent, the tank may be conveniently loaded with acid through member 13. To load the car, bolts 28 are withdrawn permitting removal of flange 24, it being unnecessary to break the joint between flanges 25 and 40. The acid loading line, which may terminate in a piece of hard-rubber pipe or rubber hose, is inserted in the dome through member 13, air displaced from the tank during loading escaping through member 13. After car is loaded, the joint is made up between flanges 18 and 24 by insertion and tightening of bolts 28.

After the car has been partially or completely filled, and nozzle 20 replaced, whether at rest or in motion, as explained above pressure or vacuum may be set up within the tank because of atmospheric temperature changes or motion of the car or both. By the present invention, any abnormal pressure condition is relieved by passage of gas out of or into the tank through the chamber 35. The latter is open to the atmosphere through passages 66 and 67, and communicates with the interior of the tank through conduit 23'.

The chamber 35 is filled with porous preferably acid-resistant packing material. In accordance with the invention, sponge rubber has been found particularly suited for this purpose. The sponge rubber is preferably broken up into small pieces to provide more extensive contact surfaces. As the cross-sectional area of chamber 35 is filled with packing material, it will be seen that gases entering or leaving the tank through conduit 23', chamber 35, and passages 66 and 67 are caused to contact and pass through the packing and are efficiently filtered thereby.

During ejection of gases from the tank, caused by increased pressure, the outgoing gas stream is likely to carry appreciable amounts of liquid particles and/or acid mist, as well as true gases. The staggered arrangement of openings 63 in disk 58 and opening 62 in cup 56 forms a circuitous passage for the gas stream thus providing a baffling effect and to a large extent preventing passage of appreciable amounts of liquid particles into the chamber 35. In this manner the bulk of liquid splash which may accompany an outgoing gas current is returned directly to the tank. On the other hand, liquid particles which may enter chamber 35 are filtered out of the gas by the large contact surface of the packing material 38 and drain back into the tank through openings 62 and 63.

In actual use, particularly where the tank is used for storage or transportation of a liquid such as hydrochloric acid, the packing material 38 is likely to be damp, and contain a substantial amount of moisture derived largely from the acid gases in the tank. The moisture and the packing material together cause to a considerable degree condensation and absorption of acid mist and of hydrochloric acid gas as such and bring about return of acid as liquid to the tank. The invention is thus especially adapted for use in connection with the transportation or storage of an acid such as hydrochloric acid normally a gas but shipped in a water solution. Moisture from the solution keeps the porous acid resistant packing material, such as sponge rubber or spun glass, in the chamber 35 in a condition sufficiently saturated with moisture to absorb to a large extent escaping hydrochloric acid gas to return the same in aqueous solution to the tank. In any event, uncondensed or unabsorbed acid is ejected through the vent as gas and not as liquid or mist, and thus the highly destructive effect of acid spray on the exterior surface of the car is prevented.

Another particular advantage arising from the use of the vent device of the invention has to do with the filtration of gas drawn into the tank. When conditions are such that a vacuum is created in the tank, air is drawn into the interior of the tank through passages 66 and 67. Such air is caused to pass through the packing material and because of the large contact surface presented thereby, the air is filtered and foreign matter is prevented from entering the tank. In this connection, it is noted the arrangement of passage 67 is such that air is drawn into the vent cap in a direction other than vertically downward, this feature preventing dust and dirt from the atmosphere settling directly into vertical passage 66. These features are advantageous especially where the vent device is used in connection with tanks for storage or transportation of liquids of nature such that it is especially desirable to avoid contamination by impurities which may be in the air.

At destination, the car may be unloaded by application of air pressure, or the acid might be syphoned out. If a syphon is to be used bolts 28 are removed, the joints broken between flanges 18 and 24, and the end of a hose or pipe is pushed down to the bottom of the car through member 13, the syphon being started by filling the line with water. If car is to be unloaded by air pressure, the vent cap 32 is taken off by withdrawal of bolts 42. The blind flange 72 is then removed, and the discharging line is connected to flange 71. The air line, which terminates in a flange, is then connected to flange 25, bolts 42 replaced, and the valve in air line opened to admit compressed air in amount sufficient to discharge contents through pipe 70 and the discharge line connected to flange 71. After unloading, the vent cap 32 and the blind flange are replaced, and car is ready for return.

The vent construction provided by the invention overcomes damage to the rubber lining in the tank arising from abnormal pressure conditions as observed above, to a large extent prevents damage to the exterior of the tank caused by the corrosive action of escaping gases, and eliminates acid splash through the vent. Although the invention has been described as applied to a tank used for storage or transportation of an acid, it will be understood the principles of the invention may be employed in connection with storage and/or transportation of other substances. It will also be understood other materials may be employed in the construction of all parts of the device, and other suitable packing material may be used in place of sponge rubber.

I claim:

1. The combination with a tank of a pipe section forming a passage communicating with the interior of the tank, a casing providing therein a chamber adapted to contain packing material, means for attaching the casing to the pipe section, a shoulder in the casing adjacent the pipe section, a perforated plate engaging the shoulder, said plate being adapted to support packing material in the chamber, a baffle between the plate and the pipe section having an opening out of alignment with a perforation in the plate whereby admission of liquid particles to the chamber is impeded, means for holding the plate and the baffle in the casing, and a passage between the chamber and the atmosphere.

2. The combination with a rubber lined tank of a rubber lined pipe section communicating with the interior of the tank, a casing of acid resistant material providing therein a chamber, sponge rubber packing in the chamber, means for attaching the casing to the pipe section, a shoulder in the casing adjacent the pipe section, a perforated cup having a flange engaging the shoulder, said cup being adapted to support the packing in the chamber, a baffle plate the outer edge of which engages the flange on the cup, means for holding the plate against the cup, said baffle plate having an opening out of alignment with a perforation in the cup, and a passage communicating at one end with the chamber and opening into the atmosphere off the upward vertical.

3. The combination with a tank of a casing providing therein a chamber adapted to contain packing material, means for attaching the casing to the tank so as to afford a passage between the chamber and the tank, a perforated plate in the end of the casing adjacent the tank for supporting the packing material in the chamber, a baffle between the plate and the tank having an opening out of alignment with a perforation in the plate whereby admission of liquid particles to the chamber is impeded, and a passage between the chamber and the atmosphere.

4. The combination with a tank of a casing providing therein a chamber, sponge rubber packing in the chamber, means for attaching the casing to the tank so as to afford a passage between the chamber and the tank, a perforated plate in the end of the casing adjacent the tank for supporting the packing material in the chamber, a baffle between the plate and the tank having an opening out of alignment with a perforation in the plate whereby admission of liquid particles to the chamber is impeded, and a passage between the chamber and the atmosphere.

MICHAEL D. SWORDS.